United States Patent [19]

Roller et al.

[11] 4,359,217
[45] Nov. 16, 1982

[54] INVERTER WITH PROPORTIONAL FORCE PAPER DRIVE

[75] Inventors: George J. Roller; Danny J. Prats, both of Rochester, N.Y.

[73] Assignee: Xerox Corporation, Stamford, Conn.

[21] Appl. No.: 182,919

[22] Filed: Sep. 2, 1980

[51] Int. Cl.³ .................. B65H 29/20; B65H 29/70
[52] U.S. Cl. .................................. 271/186; 271/65; 271/188; 271/DIG. 9
[58] Field of Search .............. 271/DIG. 9, 65, 184, 271/186, 188, 291, 3, 314, 225, 272, 273, 274; 355/3 SH, 23, 24; 493/420, 421; 198/403

[56] References Cited

U.S. PATENT DOCUMENTS

| | | | |
|---|---|---|---|
| 1,261,998 | 4/1918 | Anderson | 271/244 |
| 2,472,931 | 6/1949 | Yohn | 271/65 X |
| 2,901,246 | 8/1959 | Wagner | 271/65 X |
| 3,273,886 | 9/1966 | Taylor | 271/DIG. 9 X |
| 3,416,791 | 12/1968 | Beckman et al. | 271/65 |
| 3,672,664 | 6/1972 | Santirocco et al. | 271/DIG. 9 X |
| 3,885,664 | 5/1975 | Fujimura | 271/DIG. 9 X |
| 4,159,824 | 7/1979 | Stange et al. | 271/184 X |
| 4,214,740 | 7/1980 | Acquaviva | 271/DIG. 9 X |
| 4,285,508 | 8/1981 | Kaneko | 271/65 X |

OTHER PUBLICATIONS

Bullock, M. K., "Sheet Reverser", *IBM Tech. Disc. Bull.*, vol. 20, No. 1, Jun. 1977, p. 22.
Bach, P. S., "Sheet Inverter", *IBM Tech. Disc. Bull.*, vol. 18, No. 3, Aug. 1975, pp. 628-629.

*Primary Examiner*—Bruce H. Stoner, Jr.

[57] ABSTRACT

A copier capable of producing simplex and duplex copies includes a tri-roll inverter that employs a corrugating roll on roll return force applicator located downstream from the tri-roll input/output members. A sheet coming into the inverter is driven by a pair of the tri-rolls into a nip formed between corrugating rings mounted on the dual rolls of the return force applicator. One of the rolls has a minimal friction force and rotates continuously in the opposite direction to the incoming sheet. When the last portion of the sheet is driven into the corrugation nip, the friction force of the nip will cause the sheet to buckle into an output nip of the tri-roll members for outward movement.

3 Claims, 3 Drawing Figures

INVERTER WITH PROPORTIONAL FORCE PAPER DRIVE

The present invention relates to an improved sheet inverting system, and more particularly to an inverter providing improved handling of variable sized sheets within the inverter which employs a proportional drive return force applicator.

As xerographic and other copiers increase in speed, and become more automatic, it is increasingly important to provide higher speed yet more reliable and more automatic handling of both the copy sheets being made by the copier and the original document sheets being copied. It is desired to accommodate sheets which may vary widely in size, weight, thickness, material, condition, humidity, age, etc. These variations change the beam strength or flexural resistance and other characteristics of the sheets. Yet the desire for automatic and high speed handling of such sheets without jams, misfeeds, uneven feeding times, or other interruptions increases the need for reliability of all sheet handling components. A sheet inverter is one such sheet handling component with particular reliability problems.

Although, a sheet inverter is referred to in the copier art as an "inverter", its function is not necessary to immediately turn the sheet over (i.e., exchange one face for the other). Its function is to effectively reverse the sheet orientation in its direction of motion. That is, to reverse the lead edge and trail edge orientation of the sheet. Typically in inverter devices, as disclosed here, the sheet is driven or fed by feed rollers or other suitable sheet driving mechanisms into a sheet reversing chute. By then reversing the motion of the sheet within the chute and feeding it back out from the chute, the desired reversal of the leading and trailing edges of the sheet in the sheet path is accomplished. Depending on the location and orientation of the inverter in a particular sheet path, this may, or may not, also accomplish the inversion (turning over) of the sheet. In some applications, for example, where the "inverter" is located at the corner of a 90° to 180° inherent bend in the copy sheet path, the inverter may be used to actually prevent inverting of a sheet at that point, i.e., to maintain the same side of the sheet face-up before and after this bend in the sheet path. On the other hand, if the entering and departing path of the sheet, to and from the inverter, is in substantially the same plane, the sheet will be inverted by the inverter. Thus, inverters have numerous applications in the handling of either original documents or copy sheets to either maintain, or change, the sheet orientation.

Inverters also particularly useful in various systems of pre or post collation copying, for inverting the original documents, or for maintaining proper collation of the sheets. The facial orientation of the copy sheet determines whether it may be stacked in forward or reversed serial order to maintain collation. Generally, the inverter is associated with a by-pass sheet path and gate so that a sheet may selectively by-pass the inverter, to provide a choice of inversion or non-inversion. The present invention may be utilized, for example, in the chute inverter of a simplex/duplex copying system of the type disclosed in U.S. Pat. application Ser. No. 071,613, filed Aug. 31, 1979, by the same Assignee, in the name of Ravi B. Sahay, now U.S. Pat. No. 4,278,344.

Typically in a reversing chute type inverter, the sheet is fed in and then wholly or partially released from a positive feeding grip or nip into the inverter chute, and then reacquired by a different feeding nip to exit the inverter chute. Such a temporary loss of positive gripping of the sheet by any feed mechanism during the inversion increases the reliability problems of such inverters.

The present invention is directed to improving the reliability of the inverter in this and other critical aspects of this operation, yet to also accommodate a range of different sheet sizes within th same size inverter and the same mechanism. The present invention provides these improvements with an extremely low cost and simple inverter apparatus having a uniquely constructed and positioned constantly rotating roll on roll retard drive mechanism located downstream of the sheet input and output drives.

As noted above, many inverters, particularly those utilizing only gravity, have reliability problems in the positive output or return of the sheet at a consistent time after the sheet is released in the inverter chute. Those inverters which use chute drive rollers or other drive mechanisms have a more positive return movement of the sheet, but this normally requires a movement actuator (clutch or solenoid) for the drive and either a sensor or a timing mechanism to determine the proper time to initiate the actuation of this drive mechanism so that it does not interfer with the input movement of the sheet, and only thereafter acts on the sheet to return it to the exit nip or other feed-out means. Furthermore, inverter reliability problems are aggravated by variations in the condition or size of the sheet. For example, a pre-set curl in the sheet can cause the sheet to assume an undesirable configuration within the chute when it is released therein, and interfere with feed-out.

Also, paper drive systems that incorporate constant drive forces usually cause damage to the lead edge of lightweight paper when the drive force is sufficient to drive heavyweight paper.

In contrast, the inverter disclosed herein can provide positive buckling of the sheet between drive rollers located within a chute engaging the lead edge of the sheet and an input feeder which is pushing the trail edge of the sheet into the chute, for a positive sheet ejection force. Yet, a conventional range of sheet dimensions, and a wide range of sheet thicknesses and weights, may be accommodated within this inverter chute, without damaging the lead edge of the lightweight sheets or sacrificing reliability of output feeding from the inverter chute. The inverter disclosed herein allows a highly accurate and compact inverter configuration.

A preferred feature of the present invention is to provide in a sheet inverter mechanism with sheet feed means for feeding a sheet into and out of a first end of a sheet reversing chute, to reverse the lead and trail edge orientation of the sheet, the improvement comprising nip means located within the chute for applying a constant force to the sheet that is opposite to the initial sheet direction as the sheet is being driven toward the nip means, and nip means including corrugation means for increasing the beam strength of a lightweight sheet and thereby decreasing lead edge damage to the sheet.

A further preferred feature is to provide, in a method of reversing the direction of sheets of variable dimensions and weights by feeding them into one end of a sheet reversing chute and feeding them out of the same end of said chute so that the lead edge and trail edge orientation of the sheets is reversed, the improvement comprising driving the lead edge of the sheets into said chute, corrugating the lead edge of the sheets, and applying a return force against the sheets as they are driven into said chute, said return force being applied by a roll on roll nip with one of said rolls constantly rotating in a direction opposite to the incoming direction of the sheets in order to buckle and thereby positively urge the trail edge of the sheets back out from the chute.

Further features and advantages of the invention pertain to the particular apparatus and steps whereby the above noted aspects of the invention are attained. Accordingly, the invention will be better understood by reference to the following description, and to the drawings forming a part thereof, which are approximately to scale, wherein.

Figure 1:
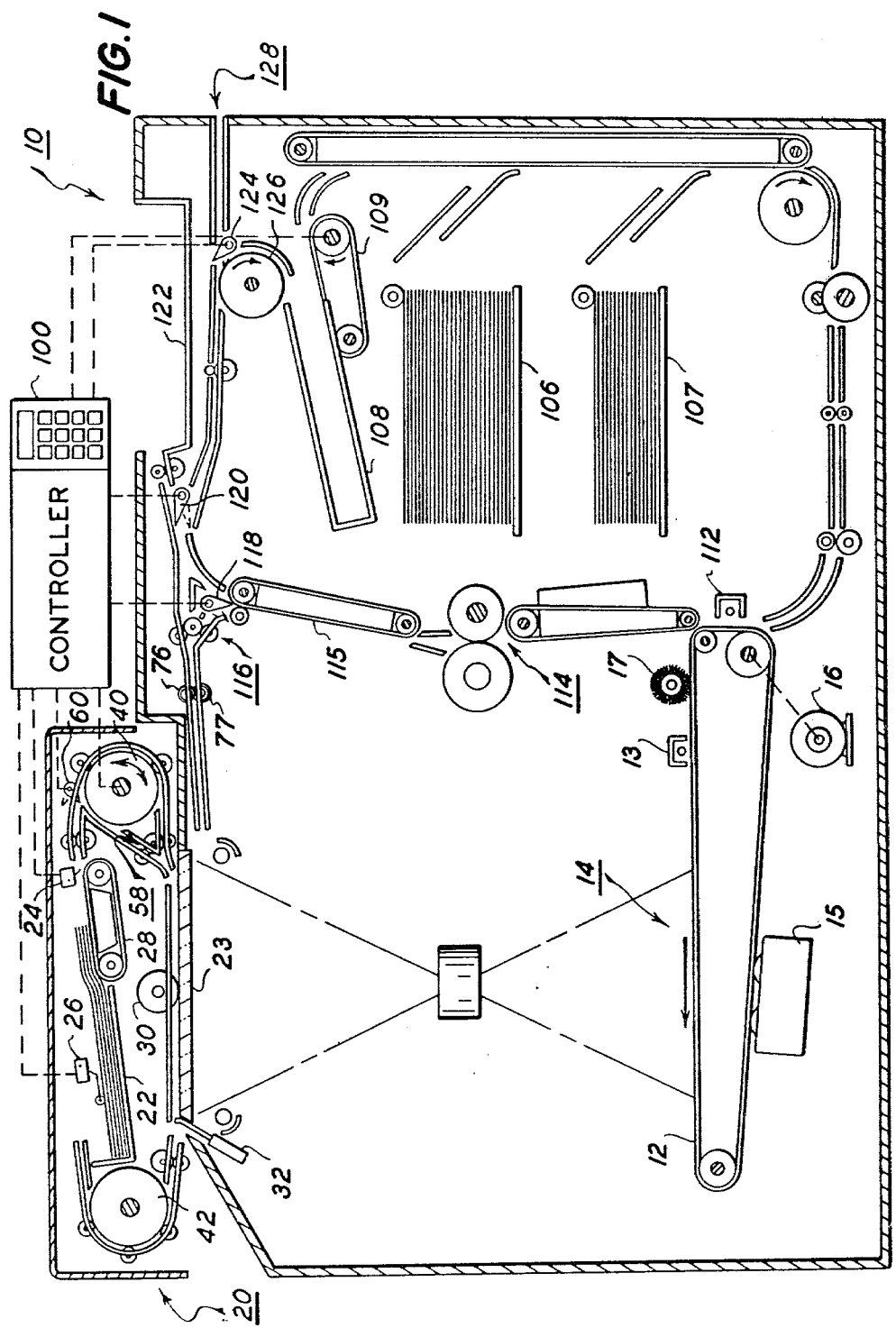
FIG. 1 is a schematic side view of an exemplary copier incorporating an aspect of the present invention.

Referring to the exemplary xerographic copier 10 shown in FIG. 1, and its exemplary automatic document feeding unit 20, it will be appreciated that various other recirculating document feeding units and copiers may be utilized with the present invention. This copier is described in detail in U.S. application Ser. No. 071,613, filed Aug. 31, 1979, and is incorporated herein by reference to the extent necessary for the practice of the present invention.

The exemplary copier 10 conventionally includes a xerographic photoreceptor belt 12 and the xerographic stations acting thereon for respectively charging 13, exposing 14, developing 15, driving 16 and cleaning 17. The copier 10 is adapted to provide duplex or simplex pre-collated copy sets from either duplex or simplex original documents copied from the recirculating document handler 20. Two separate copy sheet trays 106 and 107 are provided to feed clean copy sheets from either one. The control of the sheet feeding is, conventionally, by the machine controller 100. The controller 100 is preferably a known programmable microprocessor as exemplified by U.S. Pat. No. 4,144,450, issued to J. Donahue et al. on Mar. 13, 1979, which conventionally also controls all of the other machine functions described herein including the operation of the document feeder, the document and copy sheet gates, the feeder drives, etc., and is incorporated herein by reference. As further disclosed, it also conventionally provides for storage and comparison of the counts of the copy sheets, the number of documents recirculated in a document set, the number of copy sets selected by the operator through the switches thereon, etc.

The copy sheets are fed from a selected one of the trays 106 or 107 to the xerographic transfer station 112 for the transfer of the xerographic image of a document page to one side thereof. The copy sheets here are then fed through vacuum transports vertically up through a conventional roll fuser 114 for the fusing of the toner image thereon. From the fuser, the copy sheets are fed to a gate 118 which functions as an inverter selector finger. Depending on the position of the gate 118, the copy sheets will either be deflected into a sheet inverter 116 or bypass the inverter and be fed directly onto a second decision gate 120. Those copy sheets which bypass the inverter 116 (the normal path here) have a 90° path deflectin before reaching the gate 120 which inverts the copy sheets into a face-up orientation, i.e., the image side which has just been transferred and fused is face-up at this point. The second decision gate 120 then either deflects the sheets without inversion directly into an output tray 122 or deflects the sheets into a transport path which carries them on without inversion to a third decision gate 124. This third gate 124 either passes the sheets directly on without inversion into the output path 128 of the copier, or deflects the sheets into a duplex inverting roller transport 126. The inverting transport 126 feeds the copy sheets into a duplex tray 108. The duplex tray 108 provides intermediate or buffer storage for those copy sheets which have been printed on one side and on which it is desired to subsequently print an image on the opposite side thereof, i.e., the sheets being duplexed. Due to the sheet inverting by the roller 126, these buffer set copy sheets are stacked into the duplex tray face-down. They are stacked in the duplex tray 108 on top of one another in the order in which they were copied.

For the completion of duplex copying, the previously simplexed copy sheets in the tray 108 are fed seriatim by the bottom feeder 109 from the duplex tray back to the transfer station for the imaging of their second or opposite side page image. This duplex copy sheet path is basically the same copy sheet path provided for the clean sheets from the trays 106 or 107, illustrated at the right hand and bottom of FIG. 1. It may be seen that this sheet feed path between the duplex feeder 109 and the transfer station 112 inverts the copy sheets once. However, due to the inverting roller 126 having previously stacked these sheets face-down in the tray 108, they are presented to the transfer station 112 in the proper orientation, i.e., with their blank or opposite sides facing the photoreceptor 12 to receive the second side image. The now duplexed copy sheets are then fed out through the same output path through the fuser 114 past the inverter 116 to be stacked with the second printed side faceup. These completed duplex copy sheets may then be stacked in the output tray 122 or fed out past the gate 124 into the output path 128.

The output path 128 transports the finished copy sheets (simplex or duplex) either to another output tray, or, preferably, to a finishing station where the completed pre-collated copy sheets may be separated and finished by on-line stapling, stitching, glueing, binding, and/or off-set stacking.

Figure 2:
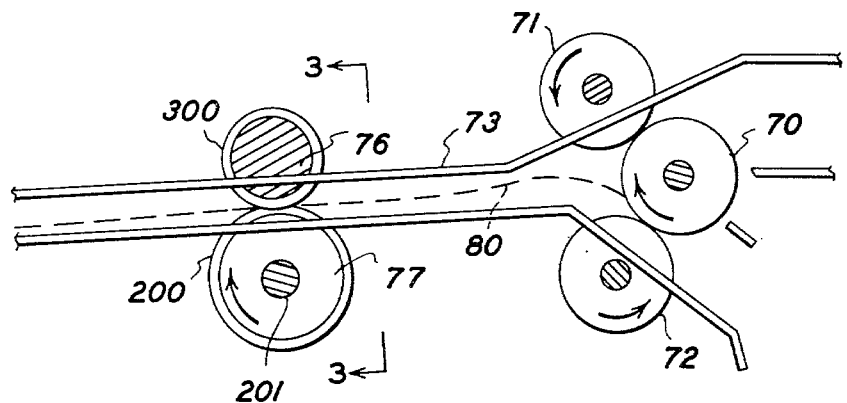
FIG. 2 is an exploded side view of the inverter shown in FIG. 1.
Figure 3:
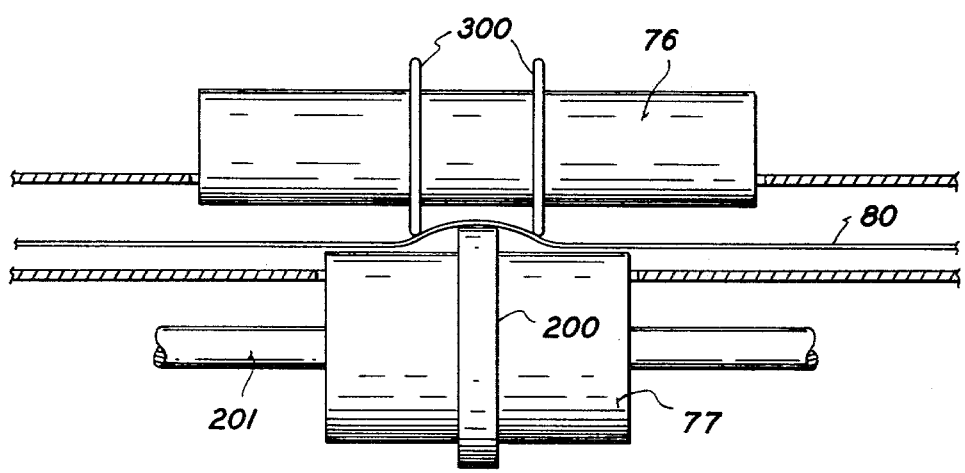
FIG. 3 is an end view of the corrugation apparatus of the invention.

In reference to an aspect of the present invention and FIG. 2, when inversion of copy sheets is required, for example, job recovery, maintaining face-up or face-down output collation, simplex/duplex copying with an odd number of simplex documents, etc., tri-roll inverter 116 is used. Copy sheets are fed from either tray 106 or 107 past transfer means 112 and onto conveyor 115. As a sheet leaves conveyor 115, it approaches decision gate 118 which is controlled by controller 100. Gate 118 is actuated to the right as viewed in FIG. 1 which causes sheet 80 to be deflected into an input nip formed by rollers 70 and 72. These rollers drive the sheet into chute 73 and subsequently into a second roll on roll nip formed between idler roll 76 and drive roller 77 which is driven by conventional means (not shown). Corrugation means 200 and 300 are mounted on roll 76 and roll 77, respectively, as shown in FIG. 3. Drive roller 77 mounted on shaft 201 is constantly rotating in a clockwise direction which is opposite to input drive roller 72. The nip formed between elastomeric rings 300 and ring 200 has slight frictional characteristics and, therefore, applies a continuous retard force against the incoming sheet. However, this retarding force is not enough to inhibit force movement of the incoming sheet through the nip. When the last portion of the sheet 80 leaves the nip between rollers 70 and 72, the friction force of nip 200, 300 will cause the sheet to buckle around roller 70 and into the output nip formed by rollers 70 and 71 for outward movement. As seen as the sheet is "walked" around roller 70 to the exit nip and is under control of the output rollers, the next sheet can be fed into the inverter allowing simultaneous sheet inversion. After moving through nip 70, 71, the sheet approaches gate 120 which is actuated by controller 100 into either the dotted line or solid line positions shown in FIG. 1 depending on the reason for inverting.

In the case of approximately horizontally positioning an inverter as disclosed herein, it has been found that successful inversion of sheets ranging from basic weights of 13# to 32# can be accomplished with a constant force retard nip equal to $\approx 0.005$ lbs. However, one of the limits to successful inversion of lighter weights of paper concurrent with maintaining a large enough drive force for heavier weights of paper is the buckling and consequent damage to the lead edge of lightweight sheets. Instead of the sheets being forced through the retard nip they buckle. This invention, as shown in FIG. 3, solves this problem by providing corrugation members 200 and 300 mounted on rollers 77 and 76, respectively. These members vary the return applicator drive force with paper stiffness and accomplishes this varying of the return drive force by using the beam strength of the sheet to create the normal force necessary to give the drive force. As the beam strength of the sheets increases, the normal force on the drive ring 200 increases, thus increasing the drive force.

In FIG. 3, according to the present invention, there is no contact between the upper roller 76 and the lower drive roller 77. This stiffness of the paper provides the normal force to the drive roller 77, which, through the friction force of ring member 200 mounted on the drive roll, is converted into drive force for the paper. As the stiffness of the paper varies, the paper drive force varies in direct proportion. Thus, different stiffness of paper can be fed through this system against devices which changes their velocities, i.e., stops or other deceleration devices, without lead edge damage to low beam strength papers, but with a large drive force for high beam strength papers.

In conclusion, a substrate inverter is disclosed that includes an input nip formed by rollers 70 and 72. Roller 72 drives the substrate material 80 through a retard force applicator having a nip formed between corrugator members 200 and 300 that are mounted on rolls 77 and 76, respectively. Rings 300 could be molded into roller 76 if desired. Roller 77 is rotated in the direction opposite the motion of the incoming substrate with a small friction force. However, this friction force is small enough so as to allow the incoming substrate to be forced through the nip. After the last portion of the substrate passes through the input nip, the friction force from the corrugating nip forces the trail edge of the incoming sheet to maintain contact with roller 70. This causes the trail edge to "walk around" to the exit nip formed between rollers 70 and 71. As soon as the substrate is under control of the exit nip, the next substrate can be fed into the inverter allowing simultaneous substrate inversion.

While the inverter system disclosed herein is preferred, it will be appreciated that various alternatives, modifications, variations or improvements thereon may be made by those skilled in the art, and the following claims are intended to encompass all of those falling within the true spirit and scope of this invention.

What is claimed is:

1. A substrate inverter, comprising:
    (a) inversion channel means;
    (b) input drive means for driving a substrate into said channel means; in an initial incoming direction;
    (c) output drive means for driving a substrate out of said channel means in an output direction generally opposite said initial incoming direction; and
    (d) corrugation nip means located within said channel means and downstream of said input drive means for corrugating the substrate in a direction generally parallel to the substrate incoming direction to increase the beam strength thereof and applying a continuous force to the substrate in a direction opposite to the initial incoming substrate direction while the substrate is being influenced by said input means and as the last portion of the substrate leaves said input means the force of said nip means will drive the substrate into said output means for movement out said channel means.

2. The inverter of claim 1, wherein said corrugation nip means includes a pair of opposed rollers with at least one ring attached to each roller.

3. A method of inverting a substrate, comprising the steps of:
    (a) providing an inversion channel means;
    (b) providing input drive means for driving a substrate into said channel means in an initial incoming direction;
    (c) providing downstream of said input drive means;
    (d) corrugating the substrate in a direction generally parallel to the substrate incoming direction by means of said corrugation nip means to increase the beam strength thereof; and
    (e) applying a continuous force to the substrate in a direction opposite to the initial incoming substrate direction by means of said corrugation nip means while the substrate is being influenced by said input means so that as the last portion of the substrate leaves said input drive means the force of said corrugation nip means will drive the substrate into an output nip for movement out of the inversion channel means.

* * * * *